United States Patent [19]

Bardsley

[11] Patent Number: 4,821,536

[45] Date of Patent: Apr. 18, 1989

[54] ROTATING DRUM END SEAL

[75] Inventor: Donald E. Bardsley, Nashua, N.H.

[73] Assignee: Ingersoll-Rand Company, Woodcliff Lake, N.J.

[21] Appl. No.: 209,597

[22] Filed: Jun. 22, 1988

[51] Int. Cl.⁴ .................. D06B 23/18; B01D 33/10; F16J 15/48
[52] U.S. Cl. ........................... 68/158; 68/139; 210/398; 210/402; 277/34.3
[58] Field of Search .................. 68/139, 140, DIG. 5, 68/148, 152, 158; 277/34, 34.3, 34.6, 226; 220/232, 240; 210/398, 402

[56] References Cited

U.S. PATENT DOCUMENTS

| 2,752,175 | 6/1956 | Fletcher | 277/34 |
| 2,894,635 | 7/1959 | Irthum et al. | 277/226 X |
| 3,167,321 | 1/1965 | Land et al. | 277/226 X |
| 3,638,797 | 2/1972 | Heckmann | 210/402 X |

FOREIGN PATENT DOCUMENTS

| 251778 | 5/1964 | Australia | 277/34.3 |
| 1317235 | 1/1963 | France | 277/34.3 |
| 154234 | 4/1956 | Sweden | 210/398 |

Primary Examiner—Philip R. Coe
Attorney, Agent, or Firm—Walter C. Vliet

[57] ABSTRACT

The seal has particular use as a seal in vats having a rotatable drum. The seal prevents material from getting between the ends of the drum and adjacent vat inside surface.

1 Claim, 2 Drawing Sheets

ROTATING DRUM END SEAL

This invention relates to rotatable vacuum or pressure washer drums used for washing pulp in pulp mills.

More particularly, this invention is a seal between the rotatable drum and an adjacent stationary member to separate a particular area of the vat from another particular area.

Pneumatic and hydraulic seals are available today but lack certain qualities for proper function. In addition, they normally seal in a unidirectional way.

The seal structure of this invention is a new and novel sealing arrangement between each end of the rotatable drum and an adjacent stationary member of the vat. The seal arrangement has the unique property of sealing in a bi-directional way.

Briefly described, a rotatable drum is mounted in a vat. A fixed circumferential, inflatable tube retainer is located at each end of the vat and adjacent the end of the rotatable drum. The inflatable tube retainer extends at least partially around the circumference of the rotatable drum. Each circumferential, inflatable tube retainer has an inside surface extending at an acute angle with respect to the axis of the rotatable drum. A circumferential wear shoe with a generally triangular cross-section is located at each end of the vat, with one side in sealing contact with the corresponding drum end. A second side faces and is parallel with the inside surface of the circumferential, inflatable tube retainer. The second side has a generally semi-cylindrical groove extending along the length of the wear shoe. An inflatable tube is located in the groove and is in contact with the inflatable tube retainer inside surface. A wear shoe retainer contacts the third side of the wear shoe and keeps the wear shoe in place.

The invention, as well as its many advantages, will be further understood by reference to the following detailed description and drawings in which.

In the various figures, like parts are referred to by like numbers.

Figure 1:
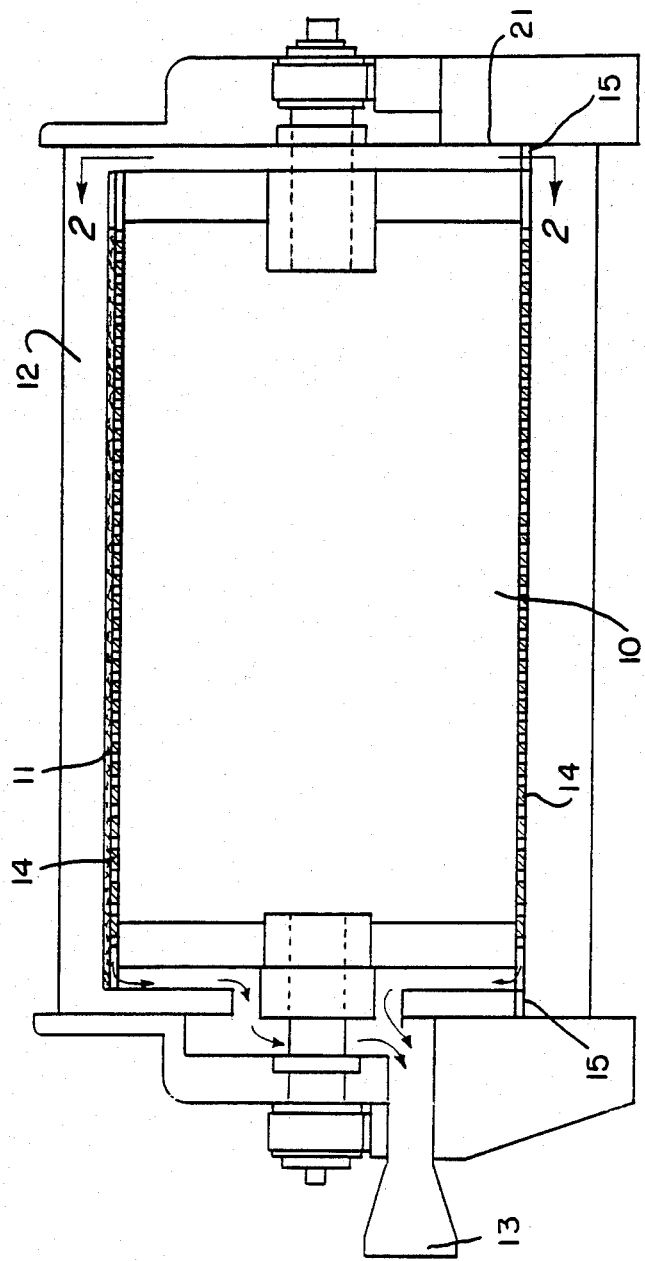
FIG. 1 is a side elevational view, partly in section, showing the use of the new seal in a vat used for the washing of pulp.

Referring to the drawings and more particularly to FIG. 1, a rotatable drum 10 is mounted for rotation within a vat 12. In operation, a pulp slurry is fed into the vat. A differential pressure is applied across the drum by, for example, a vacuum on the inside of the drum to form a pulp mat 11. Filtrate drawn into a screen or deck 14 flows from the drum through filtrate outlet 13. A seal 15, (shown schematically), is provided at each axial end of the drum. One seal will be described. It is to be understood that the other seal has the same structure as the described seal.

Figure 2:
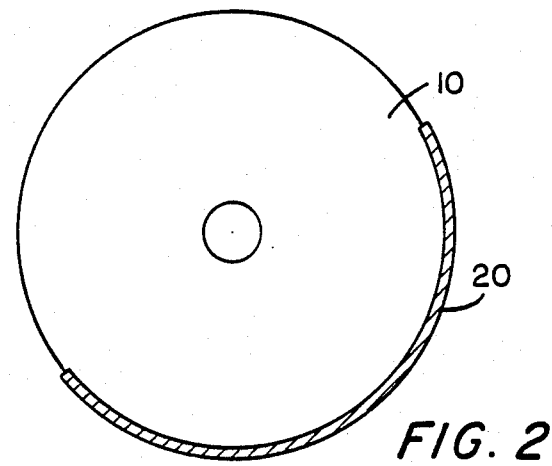
FIG. 2 is a view take along lines 2—2 of FIG. 1 and in the direction of the arrows and illustrating the circumferential positioning of the sealing arrangement.
Figure 3:
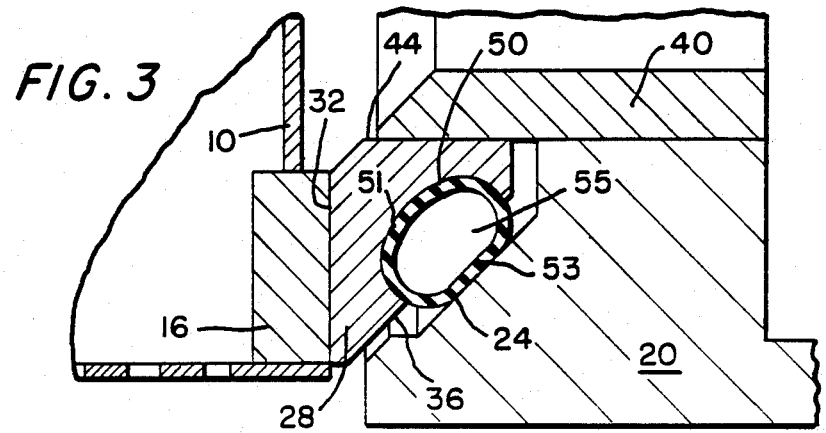
FIG. 3 is an enlarged sectional view, showing the details of the sealing structure of the embodiment of FIG. 1 and FIG. 2.

As shown in FIG. 3, the rotatable drum is provided with an end ring 16. An inflatable tube retainer 20 for retaining an inflatable tube is connected to end wall 21 of the vat (see FIG. 1). As can be seen from looking at FIG. 2, the inflatable tube retainer 20 which is fixed to the vat 12 extends approximately half way around the circumference of the drum 10. The retainer 20 has an inside surface 24, (see FIG. 3) which extends at an acute angle with respect to the axis of the rotatable drum.

Wear shoe 28 is located adjacent the axial end of the rotatable drum 10. In the embodiment shown, the wear shoe does not rotate and extends around approximately half the circumference of the drum. The wear shoe is generally triangular in cross section. The side 32 of the wear shoe 28 is in sealing contact with the end ring 16, of the rotatable drum 10. Side 36 of the wear shoe 28 faces the inside surface 24 of the inflatable tube retainer 20. Side 36 is also parallel to the inside surface 24. The wear shoe retainer 40 which keeps the wear shoe in place contacts the surface 44 of the wear shoe 28.

The side 36 of the wear shoe 28 is provided with a generally semi-cylindrical groove 50. Located within the groove 50 is an inflatable tube 55. The pressure within the inflatable tube keeps its outside surface in contact with the surface of groove 50 and the inside surface 24 of retainer 20. When first installed surface 51 in contact with the groove 50 is arcuate and side 53 in contact with the inside surface 24 of the inflatable tube retainer 20 is flat (see FIG. 3).

Figure 4:
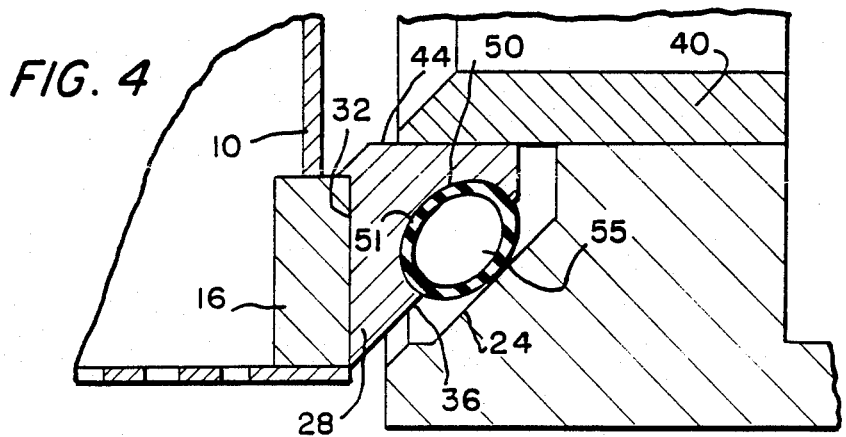
FIG. 4 is a view similar to FIG. 3, but showing the change in dimensions of the wear shoe and inflatable tube as the wear shoe wears.

The seal has particular use when it is desired to separate or exclude one particular area of the vat from another particular area of the vat. For example, if the vat is used for washing pulp, it is highly important that the pulp fibers not get between the end of the rotatable drum 10 and the end of the vat 12. Fibers between the end of the drum and the vat would act like a brake. The pressure within the inflatable tube causes a force to be directed against the end ring on the rotatable drum and also against the bottom surface of the wear shoe retainer 40. Thus, the inflatable seal has the unique property of applying a sealing force in a bi-directional way. As the wear shoe wears, the inflatable seal will change from an approximate elliptical installation configuration to a more circular configuration as shown in FIG. 4 while still maintaining a seal at all times.

I claim:

1. In combination:
a vat; a rotatable drum mounted in the vat; a circumferential, inflatable tube retainer at each end of the rotatable drum extending at least partially around the circumference of the rotatable drum and located between the end of the rotatable drum and the inside surface of the vat; each circumferential, inflatable tube retainer having an inside surface extending at an acute angle with respect to the axis of the rotatable drum; a circumferential wear shoe with a generally triangular cross-section at each end of the drum in sealing contact with the drum along a first side of the wear shoe, a second side of the wear shoe facing and parallel to said inside surface of the circumferential, inflatable tube retainer, said second side having a generally semi-cylindrical groove extending along the length of the wear shoe; an inflatable tube located in each wear shoe generally semi-cylindrical groove and in contact with said inflatable tube retainer inside surface; and a wear shoe retainer having a surface in contact with the third side of the wear shoe.

* * * * *